July 26, 1955 P. E. LYDDON 2,714,028
SEALING AND PACKING RINGS
Filed July 29, 1953 2 Sheets-Sheet 1

Inventor:
Percy Edward Lyddon
by his Attorneys:
Baldwin & Wight

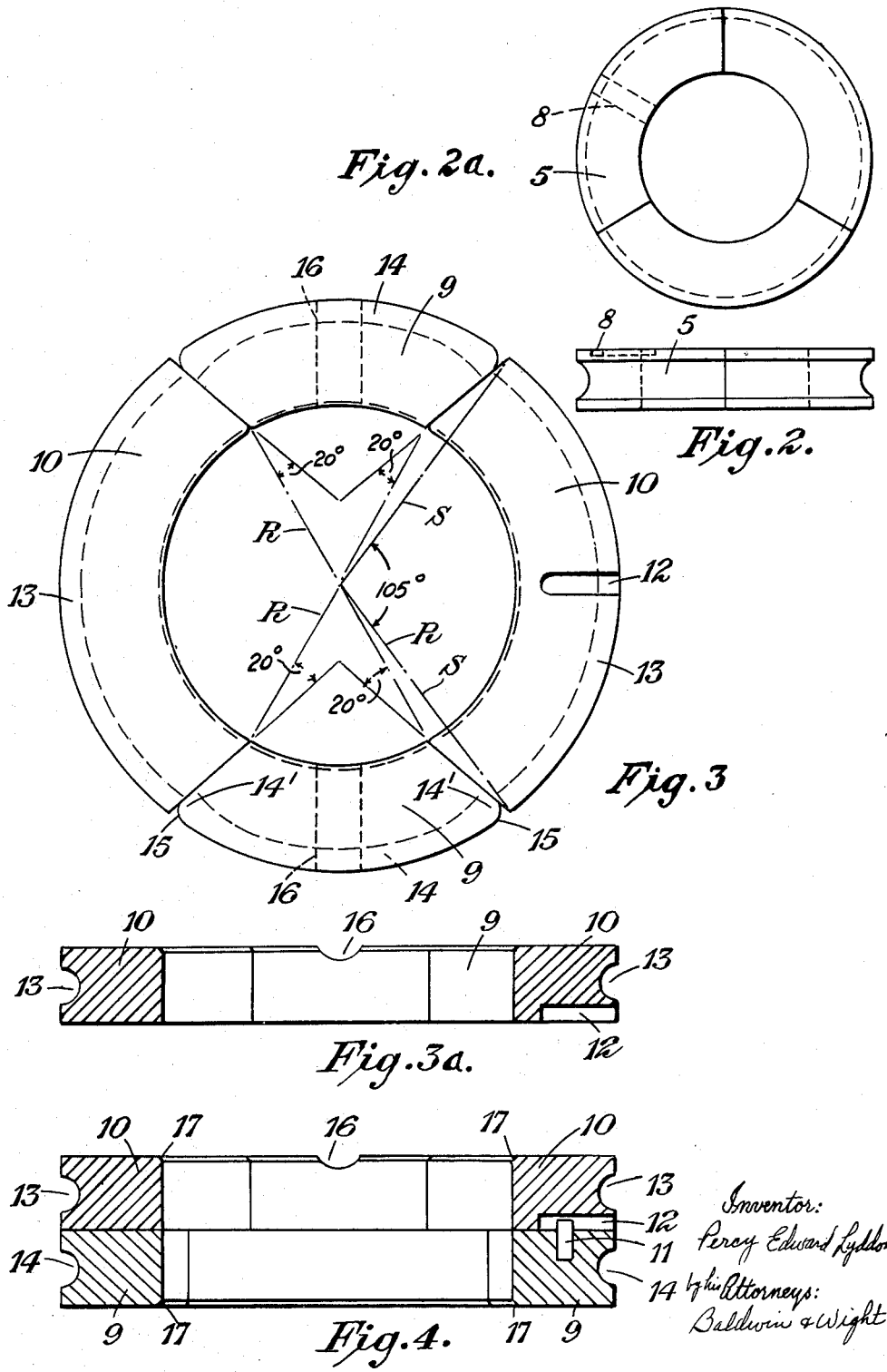

United States Patent Office 2,714,028
Patented July 26, 1955

2,714,028

SEALING AND PACKING RINGS

Percy Edward Lyddon, Croydon, Surrey, England, assignor to Morganite Incorporated, Long Island City, N. Y., a corporation of New York Application July 29, 1953, Serial No. 371,000

9 Claims. (Cl. 288—13)

This invention relates to sealing and packing rings for the prevention of leakage of a fluid, gas or liquid, under pressure, from one compartment to an adjoining one of lower pressure or to atmosphere, where a reciprocating rod passes from one such compartment to another or to atmosphere.

An object of the present invention is to provide a construction of packing ring, and of assemblies of packing rings, which will appropriately reduce the rubbing pressure on the rod.

According to the invention a packing ring for use in a gland box around a reciprocating rod and being comprised of two longer and two shorter segments is characterized in that the joint surfaces at the ends of the longer segments converge towards a point lying beyond the centre of the ring and are inclined to the radii of the ring, which pass through the innermost points of said ends, at an angle between about 12° and about 26°, and further characterized in that the relative lengths of each of said longer and shorter segments respectively are such that the angle subtended at the centre of the ring by the outer arc of the longer segment is from 95° to 135°.

By virtue of the selection of angles of slope of the joint surfaces as aforesaid, the rubbing pressure on the rod is reduced to the extent required whilst relative sliding between the segments at their abutting joint surfaces is enabled to occur, due regard being thus given to the friction angles of the materials, e. g. carbon or other self-lubricating material, suitable for the making of the packing rings.

With regard to the prescribed relative lengths of the longer and shorter segments it is important that the aforesaid angle of 135° should not be exceeded because, if it did, the smaller segments would be so small that the total fluid pressure acting radially inwards on the smaller segments would not sufficiently counterbalance the rubbing pressure of the longer segments on the shaft. Also the ends of the longer segments would become too pointed and fragile. On the other hand, if the aforesaid angle of 95° were less the longer segments would be prevented from making a sufficiently tight seal on the shaft.

The improved packing ring may have a grooved periphery to accommodate a garter spring, each segment of the ring being grooved accordingly. It is preferred to make the grooves in the shorter segments deeper towards their ends and to round the edges at the end of the outer peripheral surface of each of the shorter segments. This avoids a sharp change in direction of the garter spring when the shorter segments move outwards to allow the longer segments to move inwards as they become worn.

The packing rings according to the invention will normally be used in pairs disposed in face to face contact and with the longer segments of one ring covering the shorter segments of the other ring. A pin and slot engagement between the two rings of a pair may be provided in order to prevent relative rotation.

The outermost edge of each ring bore of an assembled pair is preferably chamfered to prevent chipping of this edge by the entering rod.

Also, the outermost face of the ring of a pair which is the more upstream in the gland box may be provided with a groove, preferably radial, running between its outer and inner periphery. This will often be desirable because for mechanical reasons the clearance may be very small axially in the housings, thus hindering equalization of the fluid pressure around the rings.

It is not necessary that the packing rings in a complete gland box should all be made according to the invention. Therefore packing rings of known types, e. g. equisegmental rings may be used in the upstream portion of the gland box in order to reduce or break down the pressure of the fluid before the latter is sealed in the downstream portion of the box by pairs of packing rings according to the invention.

An embodiment of the invention is illustrated in the accompanying drawings in which:

Figure 2 is a side elevational view of a packing ring in one part of the gland box;

Figure 2a is a plan view of the ring shown in Figure 2;

Figure 3 shows, on an enlarged scale, a plan view of a ring in another part of the gland box;

Figure 3a is a cross sectional view of the ring shown in Figure 3; and

Figure 4 is a cross sectional view of an assembly of a pair of rings shown in Figure 3.

Figure 1:
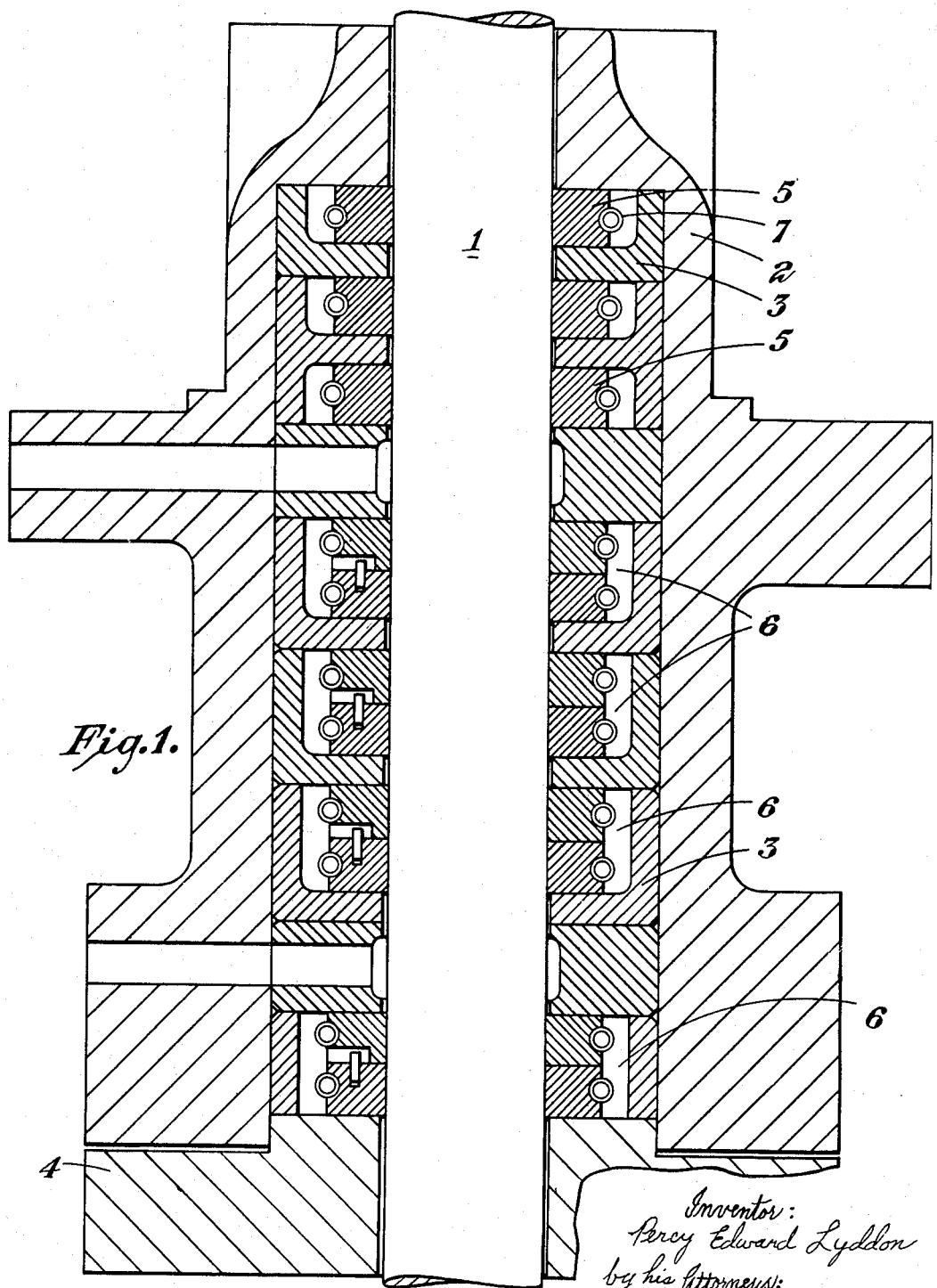
Figure 1 is a longitudinal section of a piston rod gland box.

Referring to the drawings, a piston rod 1 is mounted in a housing 2 comprising a gland box divided into compartments by a nest of partition rings 3 clamped in position by an end collar 4. The piston rod may be one which is operating a compressor, and it will be assumed that the fluid pressure is higher at the top of the housing than at the bottom. The upper part of the gland box is accordingly referred to as the upstream portion and the bottom part as the downstream portion.

In the upstream portion there are mounted around the piston rod three "pressure breaker" packing rings 5 and in the downstream portion are four pairs 6 of packing rings according to the invention.

It will be seen from Figure 2 that the pressure breaker rings 5 are of customary type comprising three equal segments normally made of carbon. Each is peripherally grooved to accommodate a garter spring 7 (Figure 1) and each is provided in the face of one segment with a pressure equalizing radial groove 8. The packing rings of the pairs 6, as will be seen from Figures 3 and 4, each consists of two opposite short segments 9 and two opposite long segments 10 normally of carbon. The joint surfaces at the ends of each of the long segments 10 converge towards a point lying beyond the centre of the ring and are inclined to the radii, indicated at R, at an angle of 20°. One ring of the pair shown in Figure 4 is provided with a pin 11 and the other ring with a slot 12 whereby the rings of the pair are prevented from rotating relatively to one another to upset the disposition that the long segments of one ring cover the short segments of the other ring.

It will be noted that the angle subtended at the centre of the ring by the outer arc of each longer segment, i. e., the angle between the lines S, is 105° which is well within the range 95° to 135° hereinbefore prescribed.

Further constructional features, for the purposes hereinbefore stated, are as follows:

The long segments are formed with peripheral grooves 13 of uniform depth whilst the short segments have peripheral grooves 14 which are deeper towards their ends as indicated at 14'.

The edges at the ends of the outer peripheral surface of each of the short segments 9 are rounded as indicated at 15.

The short segments 9 are provided at one of their faces with a radial groove 16.

The outermost edge of each ring bore of the assembled pair shown in Figure 4 is chamfered as indicated at 17.

I claim:

1. An annular packing for use in a gland box around a reciprocating rod, said packing comprising two oppositely disposed arcuate longer segments and two oppositely disposed arcuate shorter segments, said longer and shorter segments alternating and having abutting joint surfaces at their ends so as to form a ring, the longer segments being adapted to make sealing contact with the rod and the shorter segments being adapted to complete the radial sealing faces of the ring and to provide seals at the abutting joint surfaces, said joint surfaces at the ends of the longer segments converging towards a point lying beyond the center of the packing and being inclined to the radii of the packing, which pass through the innermost points of said ends, at an angle between about 12° and about 26° and the relative lengths of each of said longer and shorter segments respectively being such that the angle subtended at the centre of the packing by the outer arc of the longer segment is from 95° to 135°.

2. A packing according to claim 1 in which each segment has a grooved periphery to provide for the accommodation of a garter spring, the grooves in the shorter segments being deepened towards their ends.

3. A packing according to claim 2 in which the edges at the ends of the outer peripheral surface of each of the shorter segments are rounded.

4. A packing for use in a gland box around a reciprocating rod, said packing comprising an assembly of a pair of rings, each of which is composed of two longer arcuate segments and two shorter arcuate segments, said longer and shorter segments being alternately disposed with their abutting surfaces forming joints, the longer segments being adapted to make sealing contact with the rod and the shorter segments being adapted to complete the radial sealing faces of the ring and to provide seals at the abutting joint surfaces, said joint surfaces at the ends of the longer segments converging towards a point lying beyond the center of the packing and being inclined to the radii of the packing which pass through the innermost point of said ends, at an angle between about 12° and about 26° and the relative lengths of each of said longer and shorter segments respectively being such that the angle subtended at the center of the packing by the outer arc of the longer segments is from 95° to 135°, said rings being disposed in face to face contact with the longer segments of one ring covering the shorter segments of the other ring.

5. An assembly of rings according to claim 4 in which the radially innermost edge of each ring is chamfered.

6. An assembly of rings according to claim 4 in which one face of one of the rings is provided with a groove running between its outer and inner periphery.

7. An assembly of rings according to claim 4 in which one face of each of the shorter segments of one of the rings is provided with a groove running between its outer and inner periphery.

8. A packing for use in a gland box around a reciprocating rod, said packing comprising two oppositely disposed arcuate longer segments and two oppositely disposed arcuate shorter segments, said longer and shorter segments alternating and having abutting joint surfaces at their ends so as to form a ring, the longer segments being adapted to make sealing contact with the rod and the shorter segments being adapted to complete the radial sealing faces of the ring and to provide seals at the abutting joint surfaces, said joint surfaces at the ends of the longer segments converging towards a point lying beyond the center of the packing and being inclined to the radii of the packing which pass through the innermost point of said ends, at an angle of approximately 20° and the relative lengths of each of said longer and shorter segments respectively being such that the angle subtended at the center of the packing by the outer arc of the longer segments is approximately 105°.

9. A packing for use in a gland box around a reciprocating rod, said packing comprising an assembly of a pair of rings, each of which is composed of two longer arcuate segments and two shorter arcuate segments, said longer and shorter segments being alternately disposed with their abutting surfaces forming joints, the longer segments being adapted to make sealing contact with the rod and the shorter segments being adapted to complete the radial sealing faces of the ring and to provide seals at the abutting joint surfaces, said joint surfaces at the ends of the longer segments converging towards a point lying beyond the center of the packing and being inclined to the radii of the packing which pass through the innermost point of said ends, at an angle of approximately 20° and the relative lengths of each of said longer and shorter segments respectively being such that the angle subtended at the center of the packing by the outer arc of the longer segments is approximately 105°, said rings being disposed in face to face contact with the longer segments of one ring covering the shorter segments of the other ring.

References Cited in the file of this patent

UNITED STATES PATENTS

| Number | Name | Date |
| --- | --- | --- |
| 525,434 | Walker | Sept. 4, 1894 |
| 758,675 | Meuser et al. | May 3, 1904 |
| 1,034,425 | Copeland | Aug. 6, 1912 |

FOREIGN PATENTS

| Number | Country | Date |
| --- | --- | --- |
| 122,074 | Australia | Aug. 21, 1946 |
| 344,640 | Great Britain | Mar. 12, 1931 |